United States Patent
Connolly

(10) Patent No.: US 6,614,569 B2
(45) Date of Patent: Sep. 2, 2003

(54) SYSTEM AND METHOD FOR NARROW CHANNEL SPACED DENSE WAVELENGTH DIVISION MULTIPLEXING/DEMULTIPLEXING

(75) Inventor: Matthew W. Connolly, Grafton, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 29 days.

(21) Appl. No.: 09/781,572

(22) Filed: Feb. 12, 2001

(65) Prior Publication Data

US 2002/0110314 A1 Aug. 15, 2002

(51) Int. Cl.[7] ................................................ H04J 14/02
(52) U.S. Cl. ............................ 359/130; 385/24; 385/37
(58) Field of Search .............................. 385/15, 24, 37; 359/127, 130

(56) References Cited

U.S. PATENT DOCUMENTS

| | | | |
|---|---|---|---|
| 5,317,576 A | * 5/1994 | Leonberger et al. | 372/6 |
| 5,825,520 A | * 10/1998 | Huber | 359/130 |
| 5,909,295 A | 6/1999 | Li et al. | 359/130 |
| 5,982,791 A | 11/1999 | Sorin et al. | 372/25 |
| 6,018,160 A | 1/2000 | Bennion et al. | 250/227.14 |
| 6,038,046 A | 3/2000 | Kaneko et al. | 359/130 |
| 6,040,932 A | * 3/2000 | Duck et al. | 359/124 |
| 6,067,178 A | * 5/2000 | Zheng | 359/124 |
| 6,310,994 B1 | * 10/2001 | Jones et al. | 385/24 |

* cited by examiner

Primary Examiner—Akm E. Ullah
Assistant Examiner—Jerry T Rahll
(74) Attorney, Agent, or Firm—Lahive & Cockfield, LLP

(57) ABSTRACT

A method and apparatus for executing narrow channel spaced dense wavelength division multiplexing ("DWDM") includes an optical multiplexor/demultiplexor with channel add/drop having a first circulator and a second circulator. A first fiber Bragg grating couples with the first circulator and the second circulator. A second fiber Bragg grating couples with the second circulator. The fiber Bragg gratings separate optical signals in an interleaved manner. The optical multiplexor/demultiplexor with channel add/drop further includes at least one optical filter in communication with the first circulator. The system can further include at least one optical filter in communication with the second circulator as well. The optical filters are spaced apart a greater distance with respect to channel spacing than the channels passing through the system. However, the unique combination of the circulators and fiber Bragg gratings allow the filters to function at the wider spacing to add/drop channel signals.

20 Claims, 4 Drawing Sheets

SYSTEM AND METHOD FOR NARROW CHANNEL SPACED DENSE WAVELENGTH DIVISION MULTIPLEXING/ DEMULTIPLEXING

FIELD OF THE INVENTION

The invention relates to a system and method for narrow channel spaced dense wavelength division multiplexing, and more particularly relates to a narrow channel spaced dense wavelength division multiplexing system and method using circulators, fiber Bragg gratings, and staggered optical filters to operate with greater efficiency.

BACKGROUND OF THE INVENTION

Conventional optical communications systems employ optical fibers as transmission mediums. Each optical fiber can carry more than one optical signal at a time. In order to maximize the amount of information that is sent over such optical fibers, conventional optical communications systems typically transmit multiple optical signals concurrently over a single optical fiber. Each optical signal is a modulated signal at a particular wavelength. As will be described below, conventional optical communications systems use multiplexing and demultiplexing to transmit the multiple optical signals.

Typical optical communications first multiplex a collection of separate signal channels (e.g., wavelengths) into a single transmission medium (e.g., optical fiber). The medium then carries the multiplexed signal channels from an origination point to a destination point. The systems then demultiplex, or separate each of the signal channels back into their original state, at the destination point of the transmission medium.

Conventional optical communications systems often employ add and drop capabilities. Individual channels may be added or dropped from the multiplexed transmission medium at any point between the origination of the signal channels and the destination point. Channel add/drop must be able to add individual signal channels and remove individual signal channels as desired.

The technology of wavelength division multiplexing experiences some level of through traffic signal loss. One additional desire in multiplexing technology is to multiplex/ demultiplex, and add/drop channels in the most efficient manner possible, so as to reduce the level of through traffic signal loss as much as possible.

SUMMARY OF THE INVENTION

There exists in the art a need for a system and method to perform narrow channel spaced dense wavelength division multiplexing ("DWDM") in a more efficient manner. The present invention provides an efficient mechanism for DWDM that is especially useful at add/drop nodes of an optical communications network. An optical multiplexor/ demultiplexor with channel add/drop, in accordance with one aspect of the present invention, includes a first circulator and a second circulator. A first fiber Bragg grating couples with the first circulator and the second circulator. A second fiber Bragg grating couples with the second circulator. The fiber Bragg gratings separate optical signals in an interleaved manner.

The optical multiplexor/demultiplexor with channel add/ drop, according to another aspect of the present invention, further includes at least one optical filter in communication with the first circulator. The system can further include at least one optical filter in communication with the second circulator as well. The optical filters are spaced apart a greater distance with respect to channel spacing than the channels passing through the system. However, the unique combination of the circulators and fiber Bragg gratings allow the filters to function at the wider spacing to add/drop channel signals.

The system, according to further aspects of the present invention, has 50 GHz fiber Bragg gratings, in combination with 100 GHz optical filters, as one embodiment. The arrangement of the fiber Bragg gratings and the circulators enables the use of the 100 GHz optical filters for more narrowly spaced signal channels.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
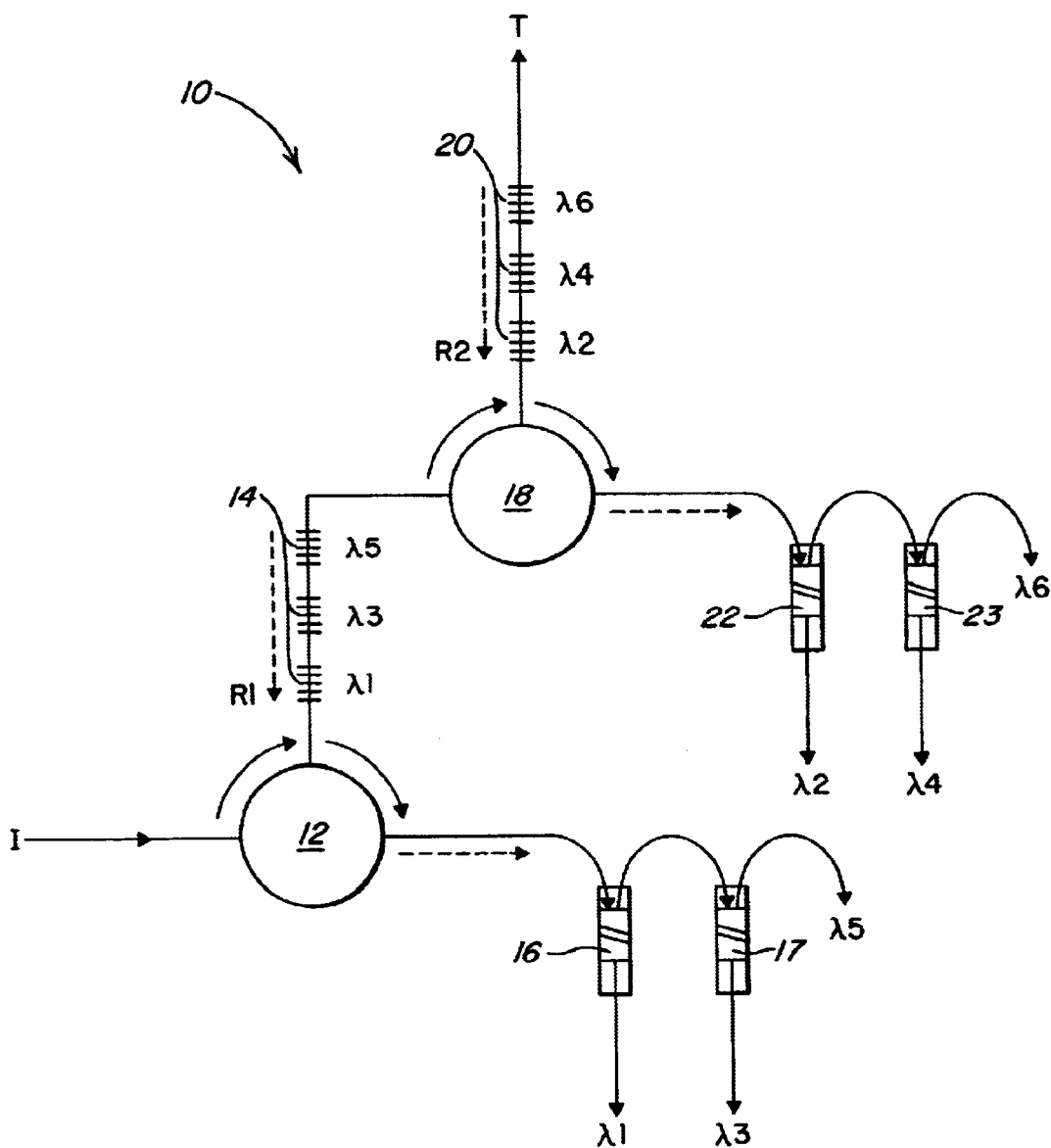
FIG. 1 is a schematic illustration of a narrow channel spaced DWDM demultiplexor with channel drop according to one aspect of the present invention.

The present invention generally relates to the use of circulators, fiber Bragg gratings, and staggered optical filters to combine in a unique and efficient manner enabling the configuration of a channel multiplexor/demultiplexor and channel add/drop device. The system and method provides for the separation of channels within the feasible limit of fiber Bragg grating technology (i.e., 50 GHz—a grating suitable for filtering channels spaced 50 GHz apart), while utilizing wider optical filters (i.e., thin film filters at 100 GHz—a filter suitable for filtering channels spaced 100 GHz apart), which are less expensive. The combination of the circulators with the fiber Bragg gratings reduces the overall number of optical circulators required. The result is reduced loss of through traffic while dropping/adding a number of channels and maintaining narrow channel spacing. The configuration utilizes relatively wider band optical filters combined with fiber Bragg grating technology to separate channels in an interleaved fashion. This enables the use of the less expensive filters because the signals are separated in an alternating/interleaving fashion to provide greater spacing between adjacent signals as they enter the filters. The use of wider optical filters also contributes to the reduced amount of signal loss.

FIGS. 1 through 4, wherein like parts are designated by like reference numerals throughout, illustrate example embodiments of circulators combined with fiber Bragg gratings and staggered optical filters according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 illustrates a channel drop/terminal demultiplexor 10 according to one embodiment of the present invention. The input channel signal enters at arrow I. The channel signal proceeds to the first circulator 12. The first circulator 12, in this arrangement, is a three-port circulator. Circulators, in general have several ports. Each circulator can take in a signal at any one port. The signal travels around the circulator to the next port along the perimeter, and exits through that port. The signals travel around the circulator in either a clockwise or a counterclockwise direction, depending on the circulator design.

The signal, in the illustrated embodiment, proceeds around the circulator 12 and out toward the fiber Bragg gratings 14. The fiber Bragg gratings reflect predetermined channel signals back in the direction from which they entered, and other channel signals pass through the fiber Bragg gratings 14 and proceed in the original direction along the path. The reflected channel signals reflect back to re-enter the circulator 12, travel around the circulator 12 and exit the circulator 12 at the next port.

In FIG. 1, signals with wavelengths $\lambda 1$, $\lambda 3$, and $\lambda 5$ are the signals that are reflected back in the direction of arrow R1. The fiber Bragg gratings 14, in accordance with aspects of the present invention, reflect back channel signals in an interleaved fashion. The odd "$\lambda$" wavelengths are an indication that every other channel signal wavelength reflects back, while intermediate interleaved channel signals, i.e., between those reflected back (the even "$\lambda$" wavelengths), proceed along the path. The result of taking out every other wavelength is that there is greater spacing between the remaining wavelengths ($\lambda 2$, $\lambda 4$, and $\lambda 6$), and there is greater spacing between the reflected wavelengths ($\lambda 1$, $\lambda 3$, and $\lambda 5$). The greater spacing between each wavelength in each group provides for better channel separation and the ability to pass the signals through larger, less costly, filters.

It should be noted that the "$\lambda x$" notation does not refer to the actual wavelength number and its condition of being odd or even, but rather the notation is an indication of the interleaving, or alternating manner by which otherwise neighboring wavelengths are separated out from their multiplexed state.

The reflected channel signals (having wavelengths $\lambda 1$, $\lambda 3$, and $\lambda 5$) enter the circulator 12 and exit the circulator once again toward the filters 16 and 17. A first filter 16 receives the signals and pulls out only the $\lambda 1$ wavelength channel signal, allowing the $\lambda 3$, and $\lambda 5$ wavelength channel signal to pass through. A second filter 17 receives the remaining channel signal and pulls out the signal having wavelength $\lambda 3$, allowing the $\lambda 5$ wavelength channel signal to pass through. The $\lambda 5$ channel signal is all that remains at this point, and thus there is no need for a third filter.

While the channel signals having wavelengths $\lambda 1$, $\lambda 3$, and $\lambda 5$ are reflecting back toward the circulator 12, those predetermined channel signals that pass through the fiber Bragg gratings 14 (those having wavelengths other than $\lambda 1$, $\lambda 3$, or $\lambda 5$) continue to the second circulator 18. These channel signals exit the circulator 18 and channel signals with predetermine wavelengths reflect off of the second set of fiber Bragg gratings 20. The fiber Bragg gratings 20, in this instance, reflect back those signals having wavelengths of $\lambda 2$, $\lambda 4$, and $\lambda 6$, while allowing any remaining signals to pass through in the direction of through traffic arrow T.

The reflected signals (with wavelengths $\lambda 2$, $\lambda 4$, and $\lambda 6$ in this embodiment) reflect back in the direction of arrow R2 through the second circulator 18 and exit the circulator 18 in the direction of the filters 22. The first filter 22 receives the signals and pulls out the signal having wavelength $\lambda 2$. The signals continue on and the second filter 23 receives the signals and pulls out the signal having wavelength $\lambda 4$, leaving the remaining signal having wavelength $\lambda 6$ to proceed. Again, there is no need for a third filter because all that is left at this point is the signal having a wavelength of $\lambda 6$.

Those of ordinary skill in the art are aware of the circulators 12 and 18 utilized herein. An example circulator appropriate for this arrangement is the CR 5500 series 3 port optical circulator manufactured by JDS-Uniphase, but the present invention is not limited to only this form of circulator.

Figure 2:
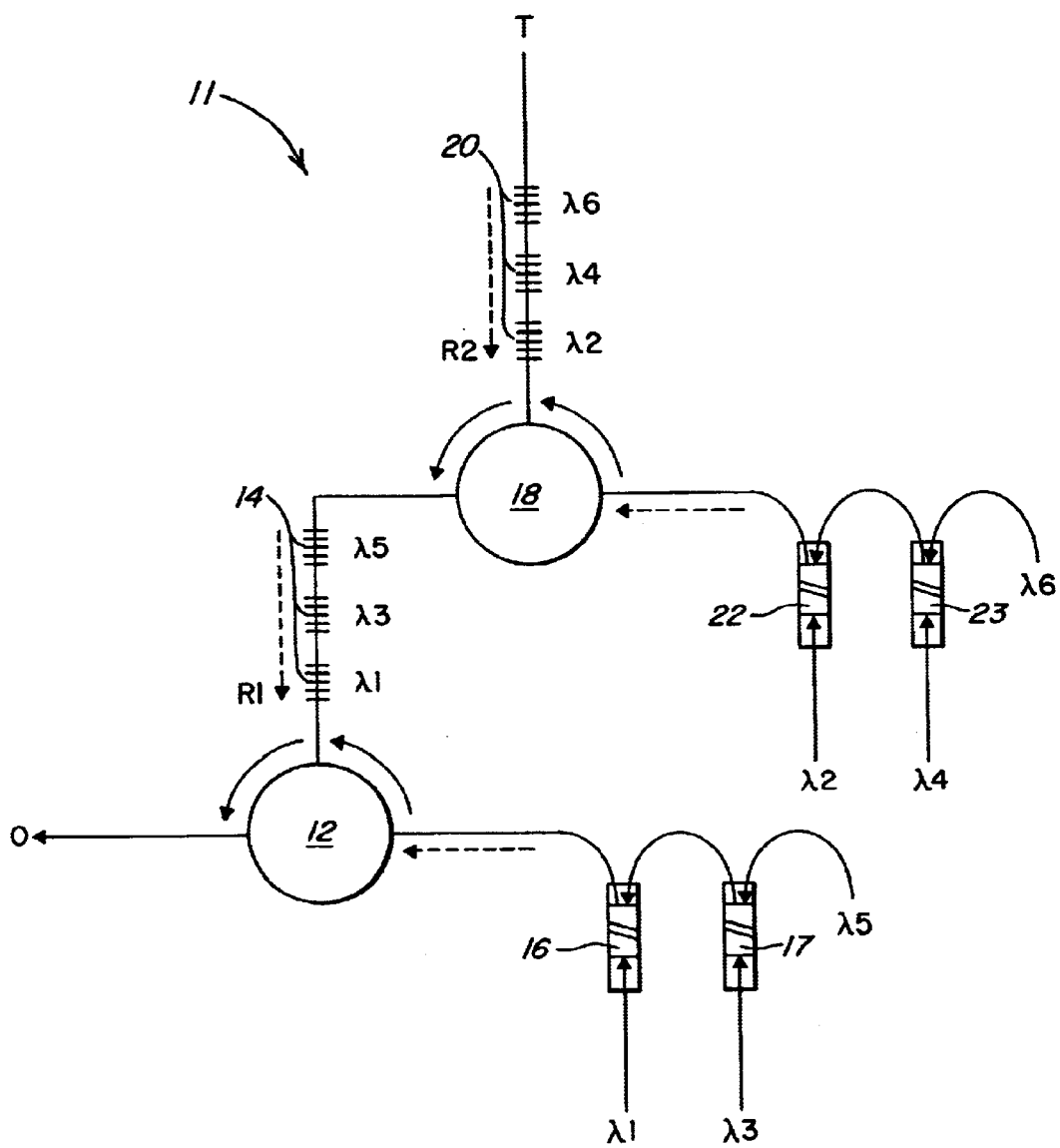
FIG. 2 is a schematic illustration of the structure of FIG. 1 serving as a narrow channel spaced DWDM multiplexor with channel add according to one aspect of the present invention.

FIG. 2 illustrates a channel add or terminal multiplexor 11. The channel add/terminal multiplexor 11 has the same structure as the channel drop/terminal demultiplexor 10, however the signals are routed in the reverse direction. In FIG. 2, signals enter through the first set of filters 16 and 17 and thus have wavelengths of $\lambda 1$, $\lambda 3$, and $\lambda 5$. The illustration does not indicate a filter for the $\lambda 5$ wavelength, but one may be included if necessary. Alternatively, the signals can enter at the same point as the illustrated filters, but already in the desired wavelengths thus omitting the need for the filters.

Other signals enter through filters 22 and 23, and thus have respective wavelengths $\lambda 2$, $\lambda 4$, and $\lambda 6$, as shown in FIG. 2. Again, the wavelengths indicated in the illustrated embodiments are merely representative of possible wavelengths. The actual wavelengths may vary, but the relationship of the wavelengths to each other, i.e., the interleaved arrangements, is maintained.

Signals entering through, and from the direction of, filters 22 and 23 enter the circulator 18 and exit through the next port to the fiber Bragg gratings 20, which reflect those signals having wavelengths $\lambda 2$, $\lambda 4$, $\lambda 6$ back in the direction of arrow R2. At this point, the reflected signals are traveling in the same direction as through traffic T back into the circulator 18 and exiting the circulator toward the direction of the second set of fiber Bragg gratings 14. The signals having wavelengths $\lambda 2$, $\lambda 4$, and $\lambda 6$, in addition to any additional through traffic signals, pass through the fiber Bragg gratings 14 and enter the circulator 12, which they then exit in the direction of output arrow O.

Simultaneously, the signals having wavelengths $\lambda 1$, $\lambda 3$, and $\lambda 5$ enter the circulator 12 from the direction of filters 16 and 17, and exit the circulator 12 at the next port toward the fiber Bragg gratings 14. The signals having wavelengths $\lambda 1$, $\lambda 3$, and $\lambda 5$ are reflected back by the fiber Bragg gratings 14 in the direction of arrow R1 into the circulator 12. The signals travel around the circulator 12 and exit in the direction of output arrow O.

Any through traffic passes through the fiber Bragg gratings 20, the circulator 18, the fiber Bragg gratings 14, and the circulator 12 before exiting in the direction of output arrow O. The added signals having wavelengths $\lambda 1$, $\lambda 2$, $\lambda 3$, $\lambda 4$, $\lambda 5$, and $\lambda 6$ are all added, via the mechanism described, to the through traffic.

Figure 3:
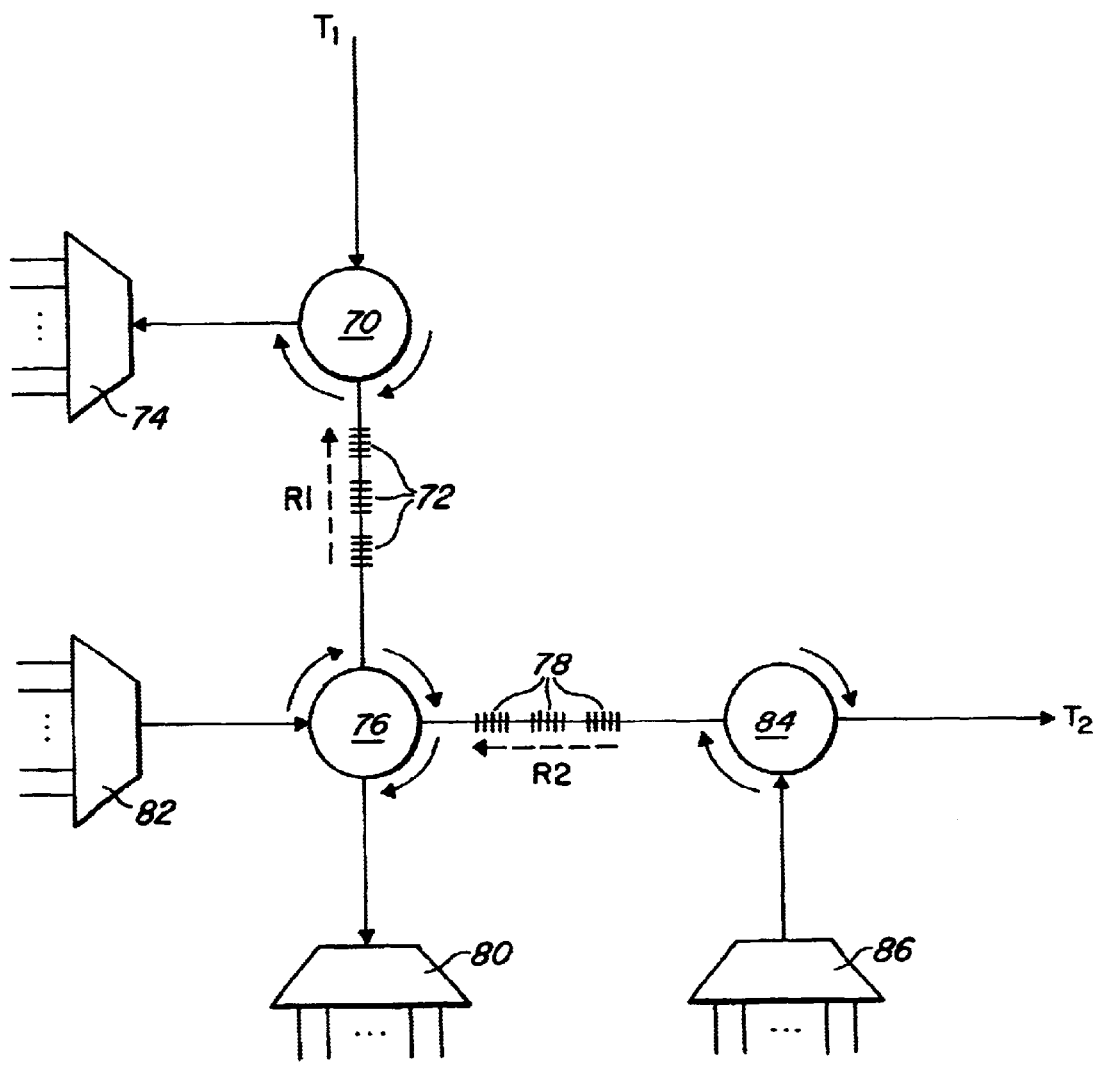
FIG. 3 is a narrow channel spaced DWDM channel add/drop according to one aspect of the present invention.

FIG. 3 illustrates a combination of the arrangements of FIGS. 1 and 2 to form a simultaneous add/drop functionality. Through traffic enters in the direction of T1 into circulator 70. The signal exits the circulator 70 to the fiber Bragg grating 72 where, in this instance, channel signals with odd wavelengths reflect back in the direction of arrow R1 to the circulator 70 while the channel signals with even wavelengths pass through the fiber Bragg grating 72. The reflected channel signals with odd wavelengths enter the circulator 70 and re-exit the circulator 70 at the next port toward the odd drop filters 74. The odd drop filters 74 remove the channel signals with odd wavelengths.

The channel signals with even wavelengths, as previously mentioned, pass through the fiber Bragg grating 72 into the circulator 76. The channel signals with even wavelengths then exit the circulator 76 at the next port and in the direction of the fiber Bragg gratings 78. The fiber Bragg gratings 78, in this instance, reflect channel signals with even wavelengths back in the direction of arrow R2 toward the circulator 76. The channel signals with even wavelengths exit the circulator 76 in the direction of the even drop filters 80. The even drop filters 80 then remove the channel signals with even wavelengths.

Channel signals with odd wavelengths enter through the odd add filters 82 into the circulator 76. The channel signals with odd wavelengths continue around the circulator 76, exiting toward the fiber Bragg gratings 72. The fiber Bragg gratings 72, in this instance, are odd channel gratings and they reflect the channel signals with odd wavelengths back in the direction of the circulator 76. The channel signals with odd wavelengths continue around the circulator 76, exiting at the next port in the direction of the fiber Bragg gratings 78. The fiber Bragg gratings 78, in this instance, reflect channel signals with even wavelengths. Therefore the channel signals with odd wavelengths pass through the fiber Bragg gratings 78 and into the circulator 84.

Channel signals with even wavelengths enter through the even add filters 86 into the circulator 84. The channel signals with even wavelengths exit the circulator 84 in the direction of the fiber Bragg gratings 78. The fiber Bragg gratings 78 reflect the channel signals with even wavelengths back into the circulator 84, combining the signals with the channel signals of odd wavelengths, both of which exit in the direction of through traffic arrow T2.

Through use of the interleaving fiber Bragg gratings 72 and 78, and the circulators 70, 76, and 84, this arrangement as taught by the present invention provides for an efficient channel add/drop device with minimal through loss and relatively low cost. The system utilizes commonly available components in a unique arrangement to manipulate narrow spaced signals with wider spaced filters.

Figure 4:
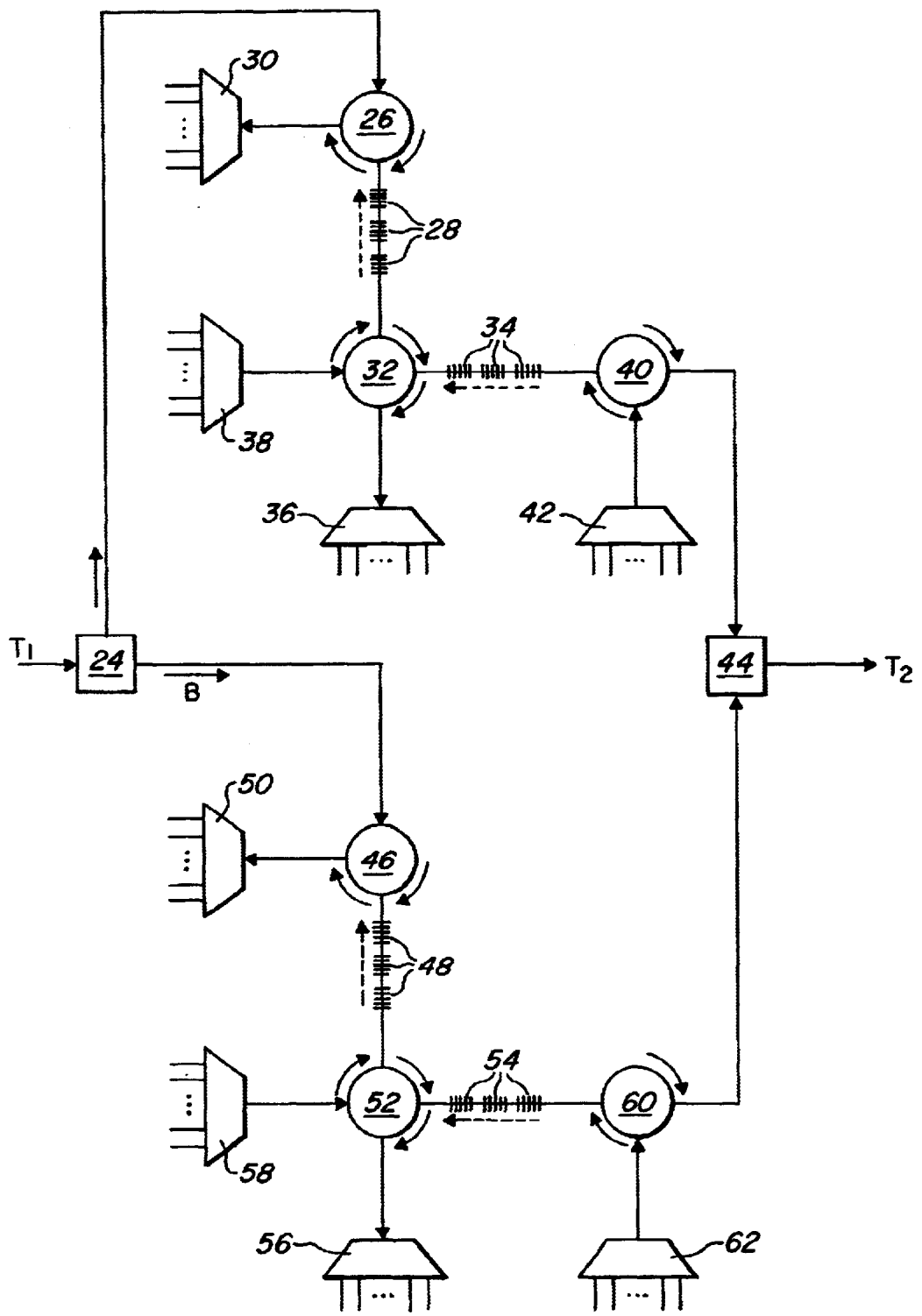
FIG. 4 is a narrow channel spaced DWDM multiplexor/ demultiplexor with channel add/drop according to one aspect of the present invention.

FIG. 4 illustrates the use of a three-port odd/even interleaving device to further decrease channel spacing. The through traffic signal enters in the direction of T1 to the odd/even interleaver 24, which separates the signal into two categories of wavelengths. The two categories are illustrated as whole-number and half-number wavelengths to demonstrate the ability to handle signals of even narrower spacing than in the previous embodiments. Again, the actual notation of a whole-number or a half-number does not directly correlate to characteristics of the actual signals. These are merely illustrative tools to indicate different wavelength spacings.

The whole-number wavelength channel signals proceed in the direction of arrow A and the half-number wavelength channel signals proceed in the direction of arrow B.

The whole-number wavelength channel signals first enter the circulator 26 and exit through the next port toward the fiber Bragg gratings 28, which are odd channel fiber Bragg gratings. The channel signals with odd wavelengths reflect back toward the circulator 26 and all other channel signals proceed toward circulator 32. Those odd channels that are reflected back toward circulator 26 enter the circulator 26 and exit toward the odd drop filters 30. The odd drop filters 30 remove the channel signals with odd wavelengths.

Those signals not reflected by the fiber Bragg gratings 28 enter the next circulator 32 and exit through the next port toward the fiber Bragg gratings 34, which reflect channel signals with even wavelengths. The channel signals with even wavelengths pass back through the circulator 32 and exit toward the even drop filters 36. The even drop filters 36 filter and remove the channel signals with even wavelengths.

As with the removal of the channel signals with even wavelengths, any channel signals with odd wavelengths can be added through the odd add filters 38 into the circulator 32. The channel signals with odd wavelengths exit the circulator 32 toward the fiber Bragg gratings 28, which reflect the odd channels back to the circulator 32. The channel signals then exit the circulator 32 through the fiber Bragg gratings 34, which reflect channel signals with even wavelengths. The channel signals with odd wavelengths pass through the fiber Bragg gratings 34 and enter the circulator 40.

The even add filters 42 add channel signals with even wavelengths to the circulator 40. The channel signals with even wavelengths proceed around the circulator 40 to the next port to exit toward the fiber Bragg gratings 34 and reflect back to the circulator 40. The channel signals with even wavelengths then combine with the channel signals having odd wavelengths and all signals exit the circulator 40 toward the odd/even interleaver 44.

The channel signals with half-number wavelengths, which exit the odd/even interleaver 24 in the direction of arrow B proceed to the circulator 46 and exit the circulator toward the fiber Bragg gratings 48. The fiber Bragg gratings 48 reflect the channel signals with odd wavelengths back into the circulator 46, allowing channel signals with even wavelengths to proceed through. The channel signals with odd wavelengths enter the circulator 46 and exit toward the odd drop filters 50, which subsequently remove the channel signals with odd wavelengths. The channel signals with even wavelengths continue on and enter the circulator 52, exiting toward the fiber Bragg gratings 54. The fiber Bragg gratings 54, in this instance, reflect the channel signals with even wavelengths back into the circulator 52. The channel signals with even wavelengths one again enter the circulator 52 and exit toward the even drop filters 56, which remove the channel signals with even wavelengths.

The odd channel filters 58 add channel signals with odd wavelengths to the circulator 52, which exit the circulator 52 toward the fiber Bragg gratings 48 and reflect back to re-enter the circulator 52. The channel signals with odd wavelengths exit the circulator 52 again, this time toward the fiber Bragg gratings 54, and pass through the gratings 54 to the circulator 60.

Even add filters 62 provide channel signals with even wavelengths to the circulator 60, which then exit the circulator 60 in the direction of the fiber Bragg gratings 54. The channel signals with even wavelengths reflect back from the fiber Bragg gratings 54 to re-enter the circulator 60 and combine with the channel signals having odd wavelengths to exit the circulator 60 toward the odd/even interleaver 44.

These half-number signals combine with the previous whole-number signals from the other side of the system and exit in the form of through traffic in the direction of arrow T2.

This approach utilizes the wider band filters (e.g., 100 GHz) combined with fiber Bragg grating technology to separate channels in an interleaved fashion. The channels can then be further separated utilizing standard filter technology (e.g., thin film, AWG). After passing through an optical circulator, channels are selected in a staggered or noncontiguous order utilizing a series of narrow fiber Bragg gratings suitable for a given channel plan. This means the gratings have high adjacent channel isolation but are spaced relatively far apart in the frequency domain. For example, a 50 GHz channel plan can use a series of very narrow gratings spaced 100 GHz apart. The reflected channels then pass backward through the circulator to be separated by wider band optical filters. Utilizing this example, the filters are intended to work on a 100 GHz channel plan. Through traffic is then fed into a second circulator, followed by a similar series of gratings. These gratings are offset from the previous series in order to select the remaining channels. The reflected channels then pass backward through the second circulator to be separated by appropriate wider band filters. Typical configurations use an odd/even type splitting of the channels. This approach is useful for channel add/drop of terminal multiplexing/demultiplexing, and provides an efficient and cost effective solution.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. An optical multiplexor with channel add system, comprising:
    a first circulator;
    a second circulator;
    a first 50 GHz fiber Bragg grating in communication with said first circulator and said second circulator; and
    a second 50 GHz fiber Bragg grating in communication with said second circulator;
    wherein said first and second 50 GHz fiber Bragg gratings separate optical signals in an interleaved manner, such that alternating wavelengths are reflected and separated out of signal through traffic.

2. The system of claim 1, further comprising at least one optical filter in communication with at least one of said first and second circulators.

3. The system of claim 2, wherein said at least one optical filter is a 100 GHz filter.

4. An optical demultiplexor with channel drop system, comprising:
    a first circulator;
    a second circulator;
    a first 50 GHz fiber Bragg grating in communication with said first circulator and said second circulator; and
    a second 50 GHz fiber Bragg grating in communication with said second circulator;
    wherein said first and second 50 GHz fiber Bragg gratings separate optical signals in an interleaved manner.

5. The system of claim 4, further comprising at least one optical filter in communication with at least one of said first and second circulators.

6. The system of claim 5, wherein said at least one optical filter is a 100 GHz filter.

7. An optical signal manipulation device, comprising:
    a first circulator;
    a second circulator;
    a first plurality of 50 GHz fiber Bragg gratings in communication with said first circulator and said second circulator; and
    a second plurality of 50 GHz fiber Bragg gratings in communication with said second circulator;
    wherein said first and second pluralities of 50 GHz fiber Bragg gratings are arranged to reflect optical signals having wavelengths spaced at a first distance apart, and said wavelengths reflected by said first plurality of 50 GHz fiber Bragg gratings are staggered by a spacing less than said first distance apart relative to said wavelengths reflected by said second plurality of 50 GHz fiber Bragg gratings.

8. The device of claim 7, further comprising at least one optical filter in communication with at least one of said first and second circulators.

9. The system of claim 8, wherein said optical filters are 100 GHz filters.

10. An optical multiplexor/demultiplexor with channel add/drop system, comprising:
    a first interleaving device for splitting a stream of optical signal through traffic into a first and second stream of optical signal through traffic;
    first and second channel multiplex/demultiplex and add/drop arrangements, each arrangement comprising:
        a first circulator in communication with a first fiber Bragg grating and a first optical filter;
        a second circulator in communication with said first fiber Bragg grating, a second fiber Bragg grating, a second optical filter, and a third optical filter; and
        a third circulator in communication with a fourth optical filter and said second fiber Bragg grating;
        wherein said first and second fiber Bragg gratings separate said optical signal through traffic in an interleaved manner, said first and second optical filters act to drop predetermined optical signals from a stream of signal through traffic and said third and fourth optical filters act to add predetermined optical signals to said signal through traffic; and
    a second interleaving device for combining said first and second streams of through traffic after said first and second streams have passed through said first and second a stream of optical signal through traffic into a first and second channel multiplex/demultiplex and add/drop arrangements.

11. The system of claim 10, wherein said first and second fiber Bragg gratings are 50 GHz gratings.

12. The system of claim 11, wherein said first, second, third, and fourth optical filters are 100 GHz filters.

13. An optical signal manipulation device with channel add/drop, comprising:
    a first circulator in communication with a first fiber Bragg grating and a first optical filter;
    a second circulator in communication with said first fiber Bragg grating, a second fiber Bragg grating, a second optical filter, and a third optical filter;
    a third circulator in communication with a fourth optical filter and said second fiber Bragg grating;
    wherein said first and second fiber Bragg gratings separate optical signals in an interleaved maimer, said first and second optical filters act to drop predetermined optical signals from a stream of signal through traffic and said third and fourth optical filters act to add predetermined optical signals to said signal through traffic.

14. The device of claim 13, wherein said first and second fiber Bragg gratings are 50 GHz gratings.

15. The device of claim 4, wherein said first, second, third, and fourth optical filters are 100 GHz filters.

16. A method of dropping signals from, or demultiplexing, a stream of through traffic optical signals, comprising the steps of:

directing said through traffic optical signals to a channel drop/demultiplexing device;

routing said through traffic optical signals through a first circulator in communication to a first plurality of 50 GHz fiber Bragg gratings and a first plurality of filters, wherein said first plurality of 50 GHz fiber Bragg gratings reflects a first plurality of optical signals to be dropped and said first plurality of filters drops said first plurality of optical signals to be dropped from said through traffic optical signals;

routing said through traffic optical signals through a second circulator in communication to a second plurality of 50 GHz fiber Bragg gratings and a second plurality of filters, wherein said second plurality of 50 GHz fiber Bragg gratings reflects a second plurality of optical signals to be dropped and said second plurality of filters drops said second plurality of optical signals to be dropped from said through traffic optical signals; and routing any remaining through traffic out of said channel drop/demultiplexing device.

17. A method of adding signals to, or multiplexing, a stream of through traffic optical signals, comprising the steps of:

directing said through traffic optical signals to a channel add/multiplexing device;

routing a first plurality of optical signals to be added through a first plurality of filters in communication to a first circulator which is in communication with a first plurality of 50 GHz fiber Bragg gratings, wherein said first plurality of optical signals to be added reflect off of said first plurality of 50 GHz fiber Bragg gratings and join said through traffic optical signals to enter said first circulator;

routing a second plurality of optical signals to be added through a second plurality of filters in communication with a second circulator which is in communication with a second plurality of 50 GHz fiber Bragg gratings, wherein said second plurality of optical signals to be added pass through said second circulator and reflect off of said second plurality of 50 GHz fiber Bragg gratings to return to said second circulator; and routing said first plurality of optical signals and said through traffic optical signals through said second plurality of 50 GHz fiber Bragg gratings and through said second circulator to combine with said second plurality of optical signals, wherein said combination of signals then exits said channel add/multiplexing device.

18. A method of adding or dropping optical signals, comprising the steps of:

directing through traffic optical signals to an add/drop device;

routing said through traffic signals through a first circulator in communication with a first plurality of fiber Bragg gratings and a first plurality of filters, wherein said first plurality of fiber Bragg gratings reflects a first plurality of optical signals to be dropped and said first plurality of filters drops said first plurality of optical signals to be dropped from said through traffic signals;

routing said through traffic signals through a second circulator in communication with a second plurality of fiber Bragg gratings, a second plurality of filters, a third plurality of filters, and said first plurality of fiber Bragg gratings, wherein said second plurality of fiber Bragg gratings reflects a second plurality of optical signals to be dropped, said second plurality of filters drops said second plurality of optical signals to be dropped, said third plurality of filters adds a first plurality of signals to be added to said through traffic signals, and said first plurality of fiber Bragg gratings reflects said first plurality of signals to be added into said second circulator; and routing said through traffic signals through a third circulator in communication with a fourth plurality of filters and said second plurality of fiber Bragg gratings, wherein said fourth plurality of filters adds a second plurality of signals to be added to said through traffic signals and said second plurality of fiber Bragg gratings reflects said second plurality of signals to be added, and said second plurality of signals to be added combine with said through traffic to exit said add/drop device.

19. The method according to claim 18, further comprising the step of passing said through traffic signals through a first interleaver prior to said directing step.

20. The method according to claim 19, wherein said directing step directs through traffic optical signals to at least two add/drop devices, said through traffic optical signals being manipulated according to the remaining steps and for each of said add/drop devices.

* * * * *